United States Patent
Huennekens et al.

(10) Patent No.: US 9,242,624 B2
(45) Date of Patent: Jan. 26, 2016

(54) ELECTRONIC PARKING BRAKE SYSTEM

(71) Applicant: FORD GLOBAL TECHNOLOGIES, LLC, Dearborn, MI (US)

(72) Inventors: Johannes Huennekens, Ocean Grove (AU); Samuel Ellis, Herne Hill (AU); Gregory Foletta, Anakie (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 14/177,343

(22) Filed: Feb. 11, 2014

(65) Prior Publication Data

US 2015/0224969 A1 Aug. 13, 2015

(51) Int. Cl.
*G05D 3/00* (2006.01)
*F16D 65/14* (2006.01)
*B60T 8/17* (2006.01)
*B60W 10/18* (2012.01)
*B60T 17/22* (2006.01)

(52) U.S. Cl.
CPC . *B60T 8/17* (2013.01); *B60T 17/22* (2013.01); *B60W 10/182* (2013.01)

(58) Field of Classification Search
CPC .......... B60T 13/02; B60T 7/04; B60T 7/045; B60T 7/08; B60T 7/085; B60T 7/104; B60T 7/105; B60T 13/662; B60T 13/683; B60T 7/12; F16H 63/3458; F16H 63/483; F16H 63/486; G05G 1/34; Y10T 74/20201
USPC ............ 701/6.01, 167, 152, 124, 122, 48, 70, 701/71, 78, 83; 180/56; 188/24.14, 24.18, 188/24.16, 73.32, 73.33, 65.3
See application file for complete search history.

(56) References Cited

U.S. PATENT DOCUMENTS

| | | | |
|---|---|---|---|
| 6,139,117 A * | 10/2000 | Shirai | B60T 13/74 188/1.11 R |
| 6,449,551 B1 * | 9/2002 | Wrede | B60T 8/00 303/20 |
| 6,701,242 B1 | 3/2004 | Diebold | |
| 6,802,401 B1 | 10/2004 | Boehm et al. | |
| 6,917,870 B2 | 7/2005 | Howell et al. | |
| 7,176,892 B2 | 2/2007 | Kobayashi | |
| 2006/0197374 A1 | 9/2006 | Jez | |
| 2008/0039288 A1 * | 2/2008 | Jagodzinski | B60T 7/107 477/197 |
| 2009/0107778 A1 * | 4/2009 | Planas Girona | B60T 7/04 188/156 |
| 2013/0096796 A1 | 4/2013 | Lee | |
| 2013/0226408 A1 * | 8/2013 | Fung | B60W 40/09 701/41 |

* cited by examiner

*Primary Examiner* — Muhammad Shafi
(74) *Attorney, Agent, or Firm* — Raymond L. Coppiellie; Brooks Kushman P.C.

(57) ABSTRACT

An electronic parking brake system having selectable modes and varying parking brake actuation dependent on the selected mode and amount of parking brake application being requested. The system provides for varying interfaces with varying programmed outputs to control a vehicle's parking brake. One such mode being a boat launch mode in which an electronic parking brake is initially actuated to 100%, the amount of parking brake application is displayed, and the driver is allowed to modulate the parking brake application through + and − buttons in combination with the visual display to allow the vehicle to back down a boat ramp using gravity.

17 Claims, 2 Drawing Sheets

ELECTRONIC PARKING BRAKE SYSTEM

TECHNICAL FIELD

This disclosure relates to parking brake systems, and specifically to the electronic control of parking brake force dependent on a selectable parking brake mode and amount of parking brake force requested.

BACKGROUND

In vehicles, a parking brake, sometimes also called an emergency brake, is a latching brake usually used to keep the vehicle stationary. It is sometimes also used to prevent a vehicle from rolling when the operator needs both feet to operate a clutch and throttle pedals. Automobile parking brake systems usually consist of a cable directly connected to the parking brake on one end and to a manually moveable mechanism at the driver's position. The mechanism is typically a hand-operated lever on either side of the driver, a pull handle located below and near the steering wheel column, or a foot-operated pedal located adjacent other foot-pedals.

In vehicles with rear drum brakes, a parking brake cable is used to actuate the drums of the drum brakes mechanically with less force than may be available through the regular hydraulic system. In vehicles with rear disc brakes, the parking brake either actuates the disc calipers via a cable or a small drum brake housed within the hub assembly (the inner circumference of the rotor is often used instead of a separate drum; sometimes referred to as a drum-in-hat rotor).

Electronic parking brakes may use an electric switch for activation/deactivation of the parking brake as opposed to the manually moveable mechanism. To its obvious advantage of only having a small switch within drivers reach versus a larger mechanism, it also has the disadvantage of not backfeeding a force, displacement, or activation feel, or for providing a modulation of the brake force being applied. With this disadvantage, having only a switch makes it impossible to use the parking brake to aid in launching a boat, enhance sporty driving whilst using the handbrake during turns, and also does not give the customer the feel of having their vehicle properly secured during parking.

SUMMARY

One aspect of this disclosure is directed to a parking brake system for a vehicle capable of actuating a parking brake to provide a variable braking force on the wheel based on a parking brake mode selected and amount of parking brake application requested. A first interface is configured to enable a user to provide the parking brake mode selection. A second interface is configured to provide the user the ability to provide the variable parking brake application request.

The controller may be programmed to, in response to the parking brake mode being a park mode and the parking brake application request being greater than zero, actuate the parking brake to provide 100% of available braking force.

The controller may be programmed to, in response to the parking brake mode being a boat launch mode and the parking brake application request being greater than zero, initially actuate the parking brake to provide 100% of available braking force and secondarily provide for reduction and modulation of the braking force via the second interface. The second interface may be a pair of buttons indicating increasing and decreasing parking brake application requests and the controller may be further programmed to indicate the amount of braking force via a visual display. Alternatively, the second interface may be a hand lever and the controller may be further programmed to actuate and move the hand lever to a position indicating a variable parking brake application request of 100% allowing the user to reduce the parking brake application by lowering the lever. The controller, in this mode, may be further programmed to utilize an electronic stability control (ESC) system to actuate individual service brakes to maintain substantially equal individual wheel speeds.

The controller may also be programmed to, in response to the parking brake mode being a sport mode and the parking brake application request being greater than 0%, actuate the parking brake to provide greater than 0% of available braking force corresponding to the amount requested, and provide for an increase and modulation of the braking force via the second interface. In this mode, the controller may be further programmed to deactivate an ESC system. In this mode, the controller may be further programmed to decouple a drive line. The second interface may be a pair of buttons indicating increasing and decreasing parking brake application requests and the controller may be further programmed to display the amount of actuation of the parking brake via a visual display. Alternatively, the second interface may be a hand lever configured to provide haptic feedback and the controller may be further programmed to alter the haptic feedback in response to a change in applied braking force of the parking brake.

In this aspect, the controller may be further programmed to, in response to an ignition status being key-off, actuate the parking brake to provide 100% of available braking force regardless of selected parking mode.

Another aspect of this disclosure is directed toward a parking brake system for a vehicle in which at least one controller is programmed to actuate a parking brake in response to (i) a parking brake mode selection and (ii) an amount of hand lever movement. An interface is configured to enable a user to provide the parking brake mode selection. The hand lever is configured to provide an electronically variable parking brake application request based on its movement. The parking brake is configured to provide variable braking force to a vehicle wheel.

The parking brake mode may be a boat launch mode and the controller may be programmed to move the lever to a position indicating a variable parking brake application request of 100%, actuate the parking brake to provide 100% of available braking force, and allow for reduction and modulation of the braking force via the lever. Alternatively, the parking brake mode may be a sport mode and the controller may be programmed to move the lever to a position indicating a variable parking brake application request of 0%, actuate the parking brake to provide 0% of available braking force, and allow for an increase and modulation of the braking force via the lever.

The vehicle may have an ESC system and the controller may be further programmed to, in response to user movement of the lever, deactivate the ESC system. The vehicle may have a decouplable driveline and the controller may be further programmed to, in response to user movement of the lever, decouple the driveline. The hand lever may be configured to provide a haptic feedback and the controller may be programmed to increase and decrease the haptic feedback as the percentage of applied braking force of the parking brake is respectively increased and decreased.

In this aspect, as with the other, the controller may be further programmed to, in response to an ignition status being key-off, actuate the parking brake to provide 100% of available braking force.

According to a further aspect of this disclosure a parking brake mode is disclosed in which a controller is programmed to, in response to a lever movement being greater than zero, deactivate an ESC system, decouple a driveline, and actuate a parking brake to provide a percentage of braking force to a vehicle wheel corresponding to the amount of lever movement. The hand lever is configured to provide an electronic parking brake application request that varies based on an amount of lever movement. The controller may be in communication with an ignition system and further programmed to, in response to an ignition status being key-off and the lever movement being greater than zero, override the correspondence of lever movement to percentage of applied braking force and actuate the parking brake to provide 100% of available braking force.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
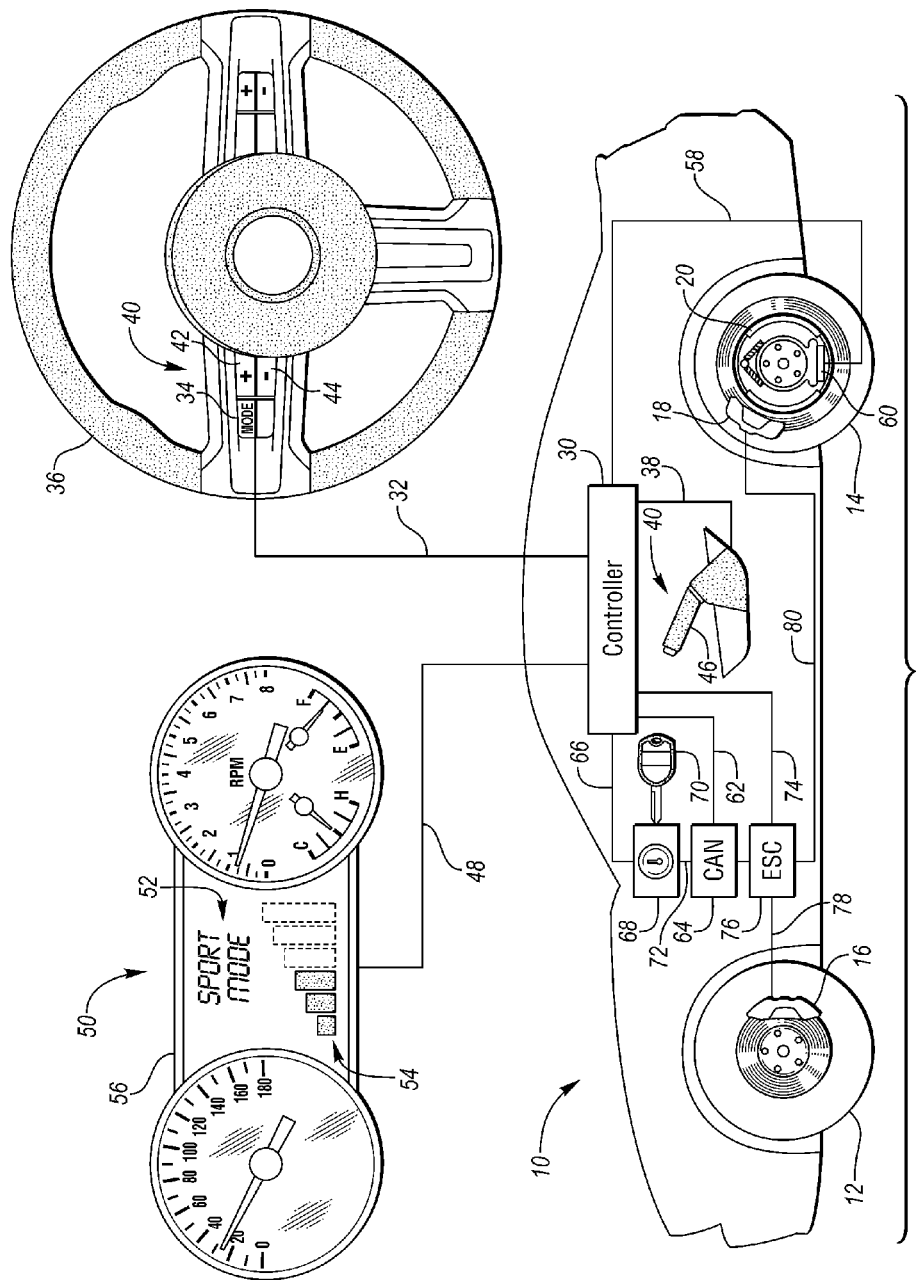
FIG. 1 is a diagrammatic view of a parking brake system controller configured to receive a parking brake mode selection and a variable parking brake application request and electronically actuating a parking brake based thereon.

FIG. 1 shows a vehicle 10 with a front and rear wheel 12, 14. The vehicle shown is symmetrical having two front wheels 12, as well as two rear wheels 14, one at each corner of the vehicle 10. Although the system disclosed is shown on a four wheeled vehicle, it may be used with vehicles having greater or fewer wheels. The front wheel 12 has a front service brake 16 shown as a front caliper 16, configured to brake the front wheel 12. The rear wheel 14 has a rear service brake 18 shown as a rear caliper 18, configured to brake the rear wheel 14. A service brake is any kind of mechanical or electro-mechanical mechanism used to decelerate a vehicle. In most vehicles a foot-pedal may be applied to actuate the service brakes 16, 18 at the wheels 12, 14 to decelerate the vehicle 10. Examples of service brakes include, but are not limited to, friction brakes, pumping brakes, electromagnetic brakes, and regenerative energy brakes.

Friction brakes are most common and often employ a stationary pad and a rotating wear surface. Common configurations include shoes that contract to rub on the outside of a rotating drum, such as a band brake; a rotating drum with shoes that expand to rub the inside of a drum, commonly called a drum brake; and pads on a caliper that pinch a rotating disc, commonly called a disc brake. Other brake configurations are used, but less often. For example, PCC trolley brakes include a flat shoe which is clamped to the rail with an electromagnet; a Murphy brake pinches a rotating drum, and an Ausco Lambert disc brake uses a hollow disc (two parallel discs with a structural bridge) with shoes that sit between the disc surfaces and expand laterally.

Friction brakes are often used in conjunction with a hydraulic system. A foot pedal is typically connected to a booster and master cylinder, which when depressed moves brake fluid through brake lines into the frictional brakes to push a piston and apply the frictional pad or shoes onto the disc or drum.

Pumping brakes are often used where a pump is already part of the powertrain. For example, an internal-combustion piston engine may have the fuel supply stopped, allowing for the internal pumping losses of the engine to provide braking. Some engines use a valve override called a Jake brake to greatly increase pumping losses. Pumping brakes may dump energy as heat, or may recharge a pressure reservoir called a hydraulic accumulator, and act as a form regenerative braking.

Electromagnetic brakes, however, are the more common form of regenerative braking. Electromagnetic brakes are often used where an electric motor is already part of the powertrain. For example, many battery electric and hybrid vehicles use the wheels to turn an electric motor which acts as a generator to charge electric batteries and the energy required to turn the motor slows the vehicle. Some vehicles do not have an electric motor but have an electromagnetic brake in the form of a secondary retarder brake that is effectively a generator with an internal short-circuit. Related types of brakes also include eddy current brakes, and electro-mechanical brakes (which actually are magnetically driven friction brakes, but nowadays are often just called "electromagnetic brakes" as well).

Vehicle 10 is also shown with an independent parking brake 20 on the rear wheel 14. A parking brake 20 is a latching brake usually used to keep the vehicle 10 stationary. In vehicles having rear drum brakes as the service brake, a parking brake cable usually actuates the service brake drum brake mechanically (as opposed to using the service brake hydraulic system) to utilize the service brake as the parking brake. In vehicles with rear disc brakes as the service brakes, a parking brake cable usually actuates the disc calipers (again, as opposed to using the hydraulic service brake system) or a small drum brake housed within the hub assembly (the inner circumference of the disc is often used instead of a separate drum and is referred to as a drum-in-hat parking brake, the kind shown here in FIG. 1).

A number of vehicles, such as light and medium duty trucks, and motor homes, have been made with a separate drum brake on the transmission output shaft; called a driveline parking brake. Larger vehicles may be fitted with power operated or power assisted parking brakes. These systems operate in a similar way as a conventional parking brake, but pulling a lever operates a valve that allows air or hydraulic pressure or vacuum into a cylinder which applies force to the parking brake. Power operated parking brakes are commonly fitted on heavy commercial vehicles with air brakes, such as trucks and buses. These usually are spring applied, with air pressure being used to hold the brake off and powerful springs holding the brakes on.

A recent variation to the parking brake is the electric parking brake. Electronic parking brakes have two main variations. In the more-traditional cable-pulling type, an electric motor simply pulls the parking brake cable on the push or pull of a button rather than a mechanical device in the cabin. A more complex unit utilizes a computer-controlled motor attached to each of the two rear brake calipers, referred to as a motor on caliper system. The disadvantage of these systems is that the electronic parking brake does not provide a backfeeding a force, displacement, or activation feel, or provide for a modulation of the parking brake force being applied.

To this end, vehicle 10 has a controller 30 configured to provide actuation of the parking brake 20 along with back-feeding a force, displacement, and activation feel, and for providing for a modulation of the parking brake force being applied. The controller 30 may be a unitary physical device, a control system made up of a plurality of controllers electrically interconnected to work together, or simply programming added to existing vehicle systems, and this system may be used with any service brake and parking brake system as previously described.

The controller 30 may be in communication (as indicated by communication line 32) with a first interface 34 configured to enable a user to select a parking brake mode. Communication line 32, as with all communication lines in this disclosure, may be a physical connection, such as an electrical cable connected on one end to the controller 30 and the other end to the first interface 34, or may be wireless in which the devices send and receive the information/data/control signal wirelessly. The first interface 34 may be a button located within the vehicle cabin in easy access to a user. An example of the first interface 34 is shown here located on a steering wheel 36. The first interface 34 may be of any construction which allows a user to select a parking brake mode, including, but not limited to, a physical button, switch, dial, conductive switch, touch screen indicator, or even voice command.

The controller 30 may be in communication (as indicated by communication line 38) with a second interface 40 configured to enable a user to input a variable parking brake application request. The second interface 40 may also be part of an assembly containing the first interface 34 and the controller 30 may communicate with the second interface 40 through the same communication line 32 in this scenario. The second interface 40 may consist of multiple buttons, such as a + button 42 and a – button 44 to allow the variable parking brake application request to be increased or decreased, respectively. Another example of the second interface 40 may be a hand lever 46. Other examples of second interfaces 40 may be pull handles and foot-pedals (not shown), among others. The second interface 40 may be located anywhere within the cabin of the vehicle within easy reach of a driver. The second interface 40 is configured to provide the variable parking brake application request based on an amount of indicated or actual movement. Vehicle 10 may also have multiple second interfaces 40, such as having both the + and – buttons 42, 44 as well as the hand lever 46, at the same time. When a vehicle 10 has more than one second interface 40, they may be redundant and work simultaneously, or they may be independent and user selectable or parking mode dependent.

The second interface 40 may also be configured to provide haptic feedback during use. In the case of the hand lever 46, the hand lever 46 may provide increasing resistance to movement as the hand lever 46 is moved to positions increasing in the amount of parking brake force being requested. The haptic feedback may be tuned to give an electronic parking brake hand lever the feel of a traditional hand brake connected to the parking brake 20 by a physical cable.

Controller 30 may be in communication (as indicated by communication line 48) with a visual display 50 configured to display the selected parking brake mode, as indicated at location 52, and/or the amount of actuation of the parking brake, as indicated at location 54. The visual display 50 may be located anywhere within the vehicle cabin in a location easy to view by a user. An example of a visual display 50 is shown on an instrument panel 56, however other locations such as, but not limited to, a display 50 on a rear view mirror, on a center counsel, or by being projected onto another surface, such as a heads up display on the windshield may be used. The display may be constantly projected, may be user selectable, or may project automatically dependent on a parking mode.

The controller 30 may be in communication with (as indicated by communication line 58) the parking brake 20. The parking brake 20 is configured to provide variable braking force on the vehicle 10. The parking brake 20 may be an electronic parking brake that utilizes a motor (not shown) to pull a cable connected to the parking brake 20 to actuate the parking brake 20, and the controller 30 may control the motor. A servo 60 may also be placed directly within, on, or in close proximity of the parking brake 20 to actuate the parking brake 20, and the communication line 58 may be in contact with the servo 60. The controller 30 may be programmed to, in response to the parking brake mode selection and amount of parking brake application requested, actuate the parking brake 20 to the amount being requested.

In the case where the second interface 40 is a hand lever 46, the controller 30 may be programmed to variably actuate the parking brake 20 to correspond to the hand lever 46 movement. The controller 30 may also be programmed to increase haptic feedback to the hand lever 46 as the hand lever 46 is moved to a position indicating an increase in desired parking brake force output. The controller 30 may also reduce the haptic feedback as the hand lever 46 is returned to a previous position. The controller may also display the amount of parking brake actuation on the visual display 50.

The controller 30 may be in communication with (as indicated by communication line 62) an internal communication network 64 configured to share vehicle data among multiple vehicle systems. An internal communication network 64 interconnects electronic systems within the vehicle and often has certain protocols that are followed such as a Controller Area Network (CAN) or a Local Interconnect Network (LIN). Special requirements for vehicle control may be included in the network 64 such as assurance of message delivery, assured non-conflicting messages, assured time of delivery, EMF noise resilience, and illumination of redundant routing. Additional demands on the network 64 should be minimalized to reduce costs and complexity. An example of shared data may be that of vehicle velocity, and the controller 30 may be programmed to obtain the vehicle velocity from the internal communication network 64 for use with any parking mode.

The controller 30 may be in communication with (as indicated by communication line 66) an ignition system 68. The ignition system 68 may be configured to provide vehicle ignition status. The ignition systems 68 typically requires a key 70 be inserted that works a lock built into a switch mechanism, although other systems exist in which no key 70 is used. The vehicle ignition status may be referred to as key-off when either a key 70 is not inserted into the switch mechanism, or when the key 70 is in the switch mechanism but has not yet been turned to the start position, or has been turned back from the start position to turn off the engine, or any equivalent status for vehicles that do not use a traditional key 70 in an ignition switch. Key-off is an indication that the vehicle may not be driven, even if the engine is running. The ignition system 68 may also be in communication with (as indicated by communication line 72) the internal communication network 64. The controller may be programmed to obtain vehicle ignition status from either the ignition system 68 or internal communication network 64.

The controller 30 may be programmed to, in response to the ignition status being key-off, actuate the parking brake to provide 100% of available braking force if any amount of parking brake application is requested. The controller 30 may be programmed to provide 100% of available braking force to the parking brake 20 regardless of which parking brake mode has been selected. The controller 30 may also be programmed to determine an ignition status, and in response to the ignition status being key-off, actuate the parking brake to provide 100% of available braking force with no parking brake application request. In other words, the controller 30 may apply the parking brake 20 automatically whenever the vehicle 10 is turned off.

The controller 30 may be programmed to, in response to the vehicle selection mode being a park mode and the parking brake application request being greater than zero, actuate the parking brake 20 to provide 100% of available braking force. In other words, when the user selects the parking mode, any application of a second interface 40 would result in 100% of available braking force being applied at the parking brake 20.

The controller 30 may be programmed to, in response to the vehicle selection mode being a boat launch mode and the parking brake application request being greater than 0%, actuate the parking brake 20 to provide 100% of available braking force and allow for reduction and modulation of the braking force via the second interface 40. In the boat launch mode, the controller 30 may send a signal to the visual display to indicate 100% parking brake application and allow the user to reduce and modulate the parking brake application using the + and − buttons 42, 44 to slowly release the parking brake 20, allowing gravity to back the vehicle 10 down a boat launch ramp, and then reapply the parking brake 20 to stop the vehicle 10. The boat launch mode may also be reset at any time by the driver to reapply the 100% parking brake application. This may provide additional usefulness when exiting the boat ramp. After loading a boat onto a trailer in the water, the driver may then modulate the release of the parking brake from a 100% application in combination with releasing a manual clutch or allowing an automatic clutch to take up slack in the drivetrain. By being able to modulate the parking brake, the system allows for load to be removed from a clutch system and also makes the engagement and drive off of the vehicle smoother.

In the boat launch mode, the controller 30 may be further programmed to move the second interface 40 to a position indicating a variable parking brake application request of 100%. For example, the controller 30 may actuate a motor (not shown) to move a hand lever 46 to a position indicating a variable parking brake application request of 100%, actuate the parking brake 20 to provide 100% of available braking force, and allow for reduction and modulation of the braking force via the hand lever 46. The controller 30 may do a similar movement if the vehicle 10 is equipped with a hand lever or foot-pedal. In a vehicle 10 having both a hand lever 46 and buttons 42, 44, both may function redundantly, the user may select which to use, or the controller 30 may only accept input from one.

In the boat launch mode, the controller 30 may be further programmed to obtain vehicle velocity from the internal communication network 64, and in response to vehicle velocity being greater than zero inhibiting an initial actuation of the parking brake 20 until an initial zero vehicle velocity is achieved via the service brakes 16, 18. In other words, the boat launch mode may include a safety feature that would not allow a 100% application of the parking brake 20 while the vehicle 10 is driving down the road. This safety feature may also be set at a predetermined velocity, such as 10 miles per hour, and also only to forward velocities and not to reverse velocities.

The controller 30 may be in communication with (as indicated by communication line 74) an electronic stability control (ESC) system 76, which in turn may be in communication (as indicated by communication lines 78 and 80) with the front and rear service brakes 16, 18, respectively. An ESC system 76, also sometimes referred to as electronic stability program (ESP) or dynamic stability control (DSC), is a computerized technology that improves the safety of a vehicle's stability by detecting and reducing loss of traction at each wheel 12, 14. When ESC detects loss of traction, it may automatically apply the service brake 16, 18 at an individual wheel 12, 14 to help the vehicle maintain stability. Some ESC systems also reduce engine power until control is regained.

Although often thought of as separate systems, the ESC system may include traction control (TCS), designed to prevent loss of traction on wheels 12, 14 being driven, and anti-lock braking systems (ABS), designed to the allow wheels 12, 14 to maintain tractive contact with a road surface while being braked, and reference to the controller 30 being in communication with an ESC system 76 includes these systems in any combination or alone.

In the boat launch mode, the controller 30 may be further programmed to, in response to the variable parking brake application request being greater than 0%, obtain individual wheel speeds from the ESC system and utilize the ESC system to actuate individual service brakes 16, 18 to maintain substantially equal individual wheel speeds. Boat launches may be slippery, and when the system is in boat launch mode and any amount of parking brake application is being requested, the controller 30 may utilize ESC, traction control, and/or ABS systems 76 to improve stability of the vehicle 10.

The controller 30 may be programmed to, in response to the vehicle selection mode being a sport mode and the parking brake application request being greater than 0%, actuate the parking brake 20 to provide greater than 0% of available braking force corresponding to the amount requested and allow for increase and modulation of the braking force via the second interface 40. The intent of the sport mode is to provide an electronic parking brake system that is computer controlled yet gives a feel and response of a traditional hard cabled parking brake system. In a vehicle with a hand lever 46, the controller 30 may be programmed to initially move the hand lever 46 to a position indicating a variable parking brake application request of 0%, actuate the parking brake to provide 0% of available braking force (in essence to reset the system from a previous mode, if needed), and then allow for increase and modulation of the braking force via the hand lever 46. In a vehicle 10 having both a hand lever 46 and buttons 42, 44, both may function redundantly, the user may select which to use, or the controller 30 may only accept input from one. In may be desirable for the controller 30 to only allow input through the buttons 42, 44 when in boat launch mode, and only through the hand lever 46 in sport mode.

In the sport mode, the controller 30 may be further programmed to, in response to the variable parking brake application request being greater than zero, deactivate the ESC system 76. In other words, when in the sport mode, any actuation request through the second interface 40 (movement of the hand lever 46) could be used to deactivate the ESC system 76 allowing a vehicle to perform a parking brake slide. Deactivation of the ESC system 76 may include deactivation of a TCS and/or ABS, or any combination of the three. In the sport mode, the controller 30 may also be programmed to, in response to actuation of the second interface 40, decouple a driveline (not shown). Sport mode may be further divided into additional modes, in which the sport mode would not deactivate or decouple any system or driveline, but an additional mode, such as a rally mode, would include the deactivation and/or decoupling.

The controller 30 may also be programmed to have default settings, or standard responses, with additional programming to supersede the response. For example, in the sport mode with a hand lever 46 in a position indicating 50% of parking brake application request, the controller 30 could be programmed to actuate the parking brake 20 to a 50% application, but then upon key-off, the controller 30 could be programmed to supersede the 50% application and automatically actuate the parking brake 20 to a 100% application. In addition any of the above disclosed programmable features may be combined in any combination and may have differing naming conventions for the modes and which programmable features are included within that mode.

Figure 2:
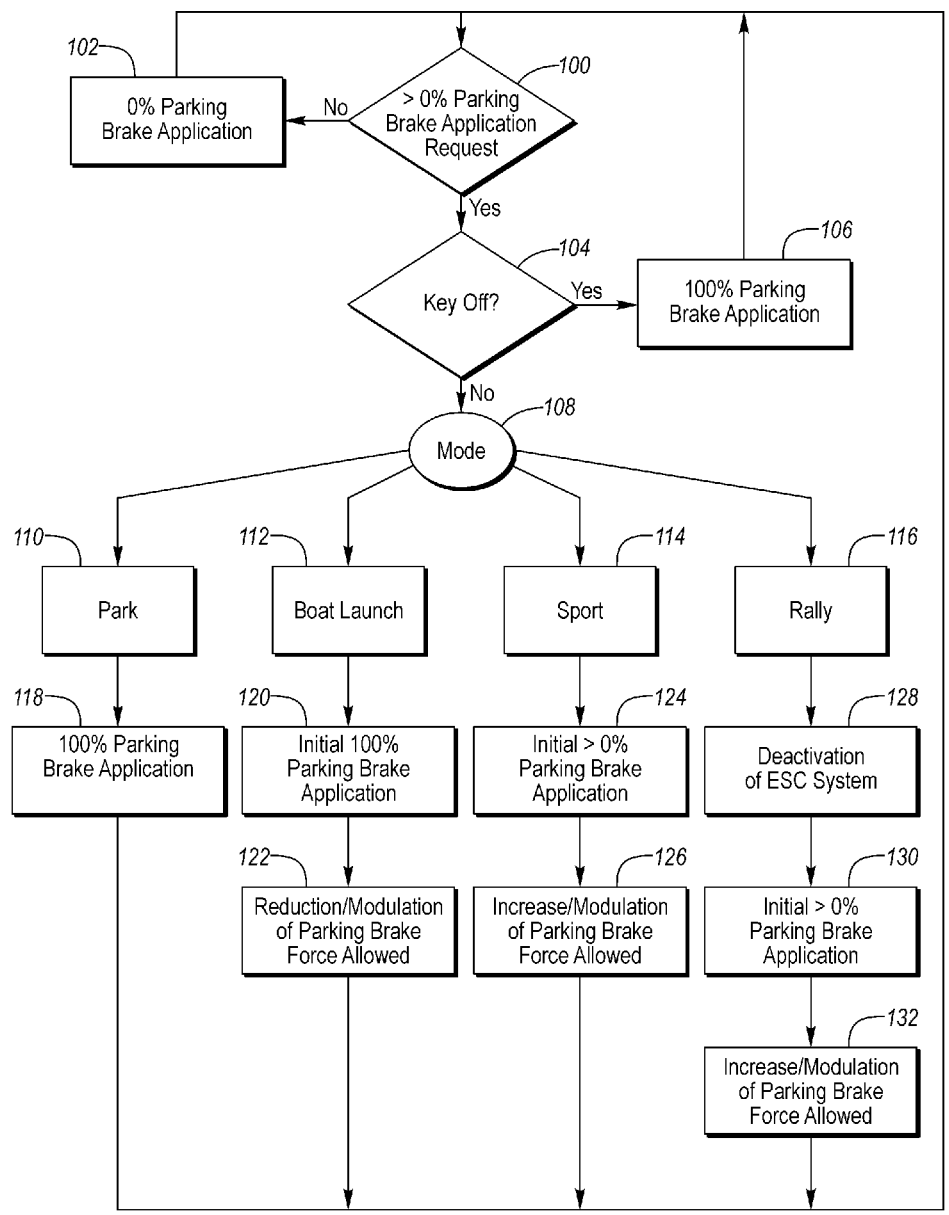
FIG. 2 is a flow chart diagram of an example of a variable parking brake mode electronic parking brake system.

FIG. 2 shows one example of a logic flow chart diagram of a variable parking brake mode electronic parking brake system. At step 100 the system checks to see if a parking brake application has been requested. If not, the logic flow moves to step 102 in which the parking brake is not applied. This logic flow is for a system that does not automatically apply the park brake when the vehicle is turned off, although the flow could be reorganized to easily provide for such a feature. The logic flow chart will do-loop between step 100 and step 102 until a brake application is requested.

If a parking brake application is requested, this system checks to see if the ignition system is off at step 104. If the ignition system is key-off, the logic flow moves to step 106 in which any amount of parking brake application requested would result in a 100% parking brake application. In this example, the logic flow chart do-loops between steps 100, 104 and 106 until the ignition status is changed or parking brake application is set to zero.

If at step 104 the ignition system is not in key-off, then the system determines the selected mode at step 108. In this example, a park mode 110, boat launch mode 112, sport mode 114, and rally mode 116 are shown, although as mentioned above, the modes may be called by other terms and include varying programmed responses. If the system is in a park mode, then the logic system moves to step 118 and applies 100% of available braking force to the park brake. The logic flow do-loops through steps 100, 104, 108, 110, and 118 until either the parking brake application request is set to zero, the ignition is changed to key-off (although in this mode that would have no effect since the parking brake is already in a 100% applied position), or until a different mode is selected.

If the system is in a boat launch mode, the logic flow progresses from step 112 to steps 120 and 122 and the system initially applies a 100% parking brake application and then allows for a reduction and/or modulation of the parking brake force. As mentioned above, the feedback to determine the amount of parking brake application could be done thorough a visual display or through haptic feedback. Boat launch mode may also include additional programmed features that are not shown in this example, such as requiring a vehicle velocity to be below a predetermined speed before actuating the parking brake.

If the system is in a sport mode, the logic flow progresses from step 114 through steps 124 and 126, in which the system initially applies a greater than zero parking brake application to correspond with the amount being requested. Modulation of the parking brake application may be modulated as the parking brake application request is modulated. As with the boat launch mode, the feedback to the user to determine the amount of parking brake application could be done thorough a visual display or through haptic feedback.

If rally mode is selected, the system deactivates ESC at step 128 and then provides the same response as if in sport mode at steps 130 and 132. This is an example of how sport mode may be additionally divided into other modes which include additional features. Rally and/or sport mode may also include the decoupling of a driveline during a parking brake application request. In other words, if driving a car in rally mode, when the driver pulls up on a hand lever, the controller could deactivate ESC, decouple a driveline, and actuate a rear parking brake to allow the vehicle to perform a parking brake slide without interference from other systems. This form of vehicle control may be advantageous in certain closed track environments such as on a dirt race track when using the vehicle for activities such as rally racing. It is the responsibility of the driver to follow and obey all traffic laws.

An example of another mode available with this system could be a starting line mode (not shown) which could provide full activation of the park brake when the vehicle is stationery, similar to that of a boat launch mode, but in this case allowing engine torque and/or horsepower to be increased before releasing the park brake. The release of the park brake could be automatic based on an engine horsepower limit, torque limit or RPM reading achieved (or RPM reading after a certain duration of time), automatically triggered by the release of a clutch lever in a manual transmission vehicle, or manually engaged by the user pressing a button, such as one of the buttons on the second interface. Modes such as the starting line mode may be separate selectable modes, such as the modes have been described above, or may be subsets of selected modes, such that the starting line mode may be embedded in the sport and rally modes and only function when those modes are selected.

In the launch mode, it may be advantageous to place the second interface on an opposing side of a steering wheel from a gear shift lever so that a driver may have their hand resting on the gear shift lever on the start line, their other hand on the steering wheel, and release of the parking brake by the flick of their thumb. This location may be especially beneficial to a vehicle with high horsepower or with close ratio gearboxes, as the need to shift to the next gear (usually second gear) is almost immediately required after the clutch is released on the start line.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:
1. A parking brake system comprising:
a first interface configured to enable a user to select one of multiple parking brake modes;
a second interface configured to provide a variable parking brake application request;
a parking brake configured to provide variable braking force on a wheel; and
a controller programmed to provide a braking force on the wheel via the parking brake based on the parking brake mode selected and amount of parking brake application requested, and in response to one of the parking brake modes being selected and the parking brake application request being greater than zero, initially actuate the parking brake to provide 100% of available braking force and secondarily provide for reduction and modulation of the braking force via the second interface.

2. The system of claim 1 wherein the controller is further programmed to, in response to an ignition status being key-off, actuate the parking brake to provide 100% of available braking force.

3. The system of claim 1 wherein the controller is programmed to, in response to the parking brake mode being a park mode and the parking brake application request being greater than zero, actuate the parking brake to provide 100% of available braking force.

4. The system of claim 1 wherein the second interface is a pair of buttons indicating increasing and decreasing parking brake application requests and the controller is further programmed to indicate the amount of braking force via a visual display.

5. The system of claim 1 wherein the second interface is a hand lever and the controller is further programmed to actuate and move the hand lever to a position indicating a variable parking brake application request up to 100%.

6. The system of claim 1 wherein the controller is further programmed to utilize an electronic stability control (ESC) system to actuate individual service brakes to maintain substantially equal individual wheel speeds.

7. The system of claim 1 wherein the controller is programmed to, in response to the parking brake mode being a sport mode and the parking brake application request being greater than zero, actuate the parking brake to provide greater than 0% of available braking force and provide for an increase of and modulation of the braking force via the second interface.

8. The system of claim 7 wherein the controller is further programmed to deactivate an ESC system.

9. The system of claim 7 wherein the second interface is a pair of buttons indicating increasing and decreasing parking brake application requests and the controller is further programmed to display the amount of actuation of the parking brake via a visual display.

10. The system of claim 7 wherein the second interface is a hand lever configured to provide haptic feedback and the controller is further programmed to alter the haptic feedback in response to a change in applied braking force of the parking brake.

11. A parking brake system for a vehicle comprising:
an interface configured to enable a user to select one of a plurality of parking brake modes;
a hand lever configured to provide an electronically variable parking brake application request;
a parking brake configured to provide variable braking force to a wheel; and
at least one controller programmed to actuate the parking brake based on the selected parking brake mode and an amount of hand lever movement,
and based on one of the parking brake modes being selected, move the lever to a position indicating a parking brake application request of 0%, actuate the parking brake to provide 0% of available braking force, and allow for an increase and modulation of the braking force via the lever.

12. The system of claim 11 wherein the controller is further programmed to, in response to an ignition status being key-off, actuate the parking brake to provide 100% of available braking force.

13. The system of claim 11 wherein the parking brake mode is boat launch and the controller is programmed to move the lever to a position indicating a parking brake application request of 100%, actuate the parking brake to provide 100% of available braking force, and allow for reduction and modulation of the braking force via the lever.

14. The system of claim 11 wherein the vehicle has an electronic stability control (ESC system and the controller is further programmed to, in response to user movement of the lever, deactivate the ESC system.

15. The system of claim 11 wherein the vehicle has a decouplable driveline and the controller is further programmed to, in response to user movement of the lever, decouple the driveline.

16. The system of claim 11 wherein the electronic hand lever is configured to provide a haptic feedback and the controller is programmed to increase and decrease the haptic feedback as the percentage of applied braking force of the parking brake is increased and decreased.

17. A parking brake system comprising:
a hand lever configured to provide an electronic parking brake application request that varies corresponding to lever movement; and
a controller programmed to, in response to lever movement exceeding zero, deactivate an electronic stability control system, decouple a driveline, actuate a parking brake corresponding to the amount of lever movement, and override the lever movement and provide 100% of available braking force when an ignition status is Key-off.

* * * * *